United States Patent [19]

Osato et al.

[11] Patent Number: 4,614,951
[45] Date of Patent: Sep. 30, 1986

[54] OPTICAL RECORDING MEDIUM

[75] Inventors: Yoichi Osato, Yokohama; Ichiro Saito, Kawasaki; Yoshio Takasu, Tama, all of Japan

[73] Assignee: Canon Kabushiki Kaisha, Tokyo, Japan

[21] Appl. No.: 806,112

[22] Filed: Dec. 5, 1985

Related U.S. Application Data

[63] Continuation of Ser. No. 562,820, Dec. 19, 1983, abandoned.

[30] Foreign Application Priority Data

Dec. 20, 1982 [JP] Japan ................................ 57-223601

[51] Int. Cl.$^4$ ............................................. G01D 15/34
[52] U.S. Cl. .............................. 346/135.1; 346/76 L; 369/288; 430/945
[58] Field of Search ...................... 346/135.1, 76 L; 430/945; 369/284, 288

[56] References Cited

U.S. PATENT DOCUMENTS

| | | | |
|---|---|---|---|
| 4,237,468 | 12/1980 | Nahara | 346/135.1 |
| 4,317,123 | 2/1982 | Namiki | 346/135.1 |
| 4,322,839 | 3/1982 | Yamashita | 346/76 L X |
| 4,373,004 | 2/1983 | Asano | 346/76 L X |

Primary Examiner—Joseph W. Hartary
Attorney, Agent, or Firm—Fitzpatrick, Cella, Harper & Scinto

[57] ABSTRACT

An optical recording medium, comprising a substrate and a thin film which contains an iodine compound, and a substance undergoing an optical change through absorption of electromagnetic radiation.

11 Claims, 4 Drawing Figures

OPTICAL RECORDING MEDIUM

This application is a continuation of application Ser. No. 562,820 filed Dec. 19, 1983 now abandoned.

This application contains subject matter related to commonly assigned copending application Ser. No. 558,755 filed Dec. 6, 1983.

BACKGROUND OF THE INVENTION

1. Field of the Invention

This invention relates to an optical recording medium for recording information by laser, etc. and reproducing the recorded information, and relates more particularly to an optical recording medium which is capable of optical recording and reproduction at high density by a laser having wavelengths in the visible and near-infrared regions and also low energy.

2. Description of the Prior Art

Generally speaking, an optical disc is capable of memorizing a high density information with a number of optically detectable small pits (e.g., about 1¾) in the form of a helical or circular track, each pit being formed on a thin recording layer provided on a substrate. For writing information in such a disc, the surface of a laser-sensitive layer is scanned by a focused laser beam, and only the surface irradiated with the laser beam forms pits, which are formed, as stated, in the form of a helical or circular track. The laser-sensitive layer is capable of forming optically detectable pits by absorption of the laser energy. For example, according to a heat mode recording system, the laser-sensitive layer absorbs heat energy and forms small recess portions (pits) through vaporization or deformation at the sites where heat energy has been absorbed. Alternatively, according to another heat mode recording system, through absorption of the laser energy irradiated, there can be formed pits differing in oxidation degree, reflectance or concentration created by chemical changes at the irradiated portions, the differences being optically detectable.

The information recorded in the optical recording medium is detected by laser scanning along the track and reading the optical changes at the portions where pits are formed and the portions where no pit is formed.

As the recording medium to be used for such recording and reproduction, there have heretofore been known metal thin films such as vapor deposited film of aluminum, films composed principally of inorganic materials such as bismuth thin film, tellurium oxide thin film or calcogenite type amorphous glass film, etc. or films of organic materials such as a plastic coated film containing a dye (pigment).

However, according to the methods of the prior art as described above wherein pits are formed by chemical changes, the sensitivity is insufficient and, moreover, the optical contrast between the pit-forming portions and the non-pit-forming is small, thus involving the disadvantage that the information recording does not have a high S/N ratio. Further, the recording medium having recording information has the drawback of lacking stability in storage over a long term. On the other hand, according to the method wherein holes are formed, while high sensitivity and high S/N ratio can be obtained, there is involved the drawback that the surface of the laser-sensitive layer exposed to the air may be oxidized in an environment of moist or an oxidative atmosphere, and become deficient in its stability. For overcoming such drawbacks, it has been proposed in the prior art to provide a protective layer on the upper and (or) lower side of the laser-sensitive layer. Such a protective layer, however, will contrariwise lower sensitivity and the S/N ratio.

SUMMARY OF THE INVENTION

An object of the present invention is to provide a novel optical recording medium which has removed the drawbacks as described above.

Another object of the present invention is to provide an optical recording medium improved in sensitivity and in changes of optical characteristics which accompany recording.

Still another object of the present invention is to provide an optical recording medium capable of maintaining records stably.

According to one aspect of the present invention, there is provided an optical recording medium, comprising a substrate and a thin film which contains an iodine compound, and a substance undergoing an optical change through absorption of electromagnetic radiation.

DESCRIPTION OF THE PREFERRED EMBODIMENTS

The film sensitive to electromagnetic radiation to be used in the optical recording medium of the present invention can be obtained by placing a material, which receives heat action by absorption of electromagnetic radiation and undergoes an optical change through such heat action, such as Te (tellurium), Pb (lead), Au (gold), Sn (tin), As (arsenic), Bi (bismuth), In (indium) or carbon black, and an iodine compound, including, for example, metal iodides such as CuI [copper (I) iodide], CsI [cesium iodide], $SnI_2$ [tin (II) iodide], $SbI_3$ ]antimony (III) iodide], $ZrI_4$ [zirconium (IV) iodide], AgI[silver iodede ], $PbI_2$ [lead (II) iodide], $TlI_3$[thallium (III) iodide] and others, in separate boats for vapor deposition, crucibles for vapor deposition or crucibles for electron beam vapor deposition, respectively, and effecting mixed vapor deposition under heating in vacuo, electron beam vapor deposition or mixed sputtering on a substrate to form a film sensitive to electromagnetic radiation. Alternatively, it can also be obtained by mixing the metal iodide as mentioned above with a substance capable of undergoing an optical change through absorption of an electromagnetic radiation, melting the mixture together by heating to form a mixed phase and subjecting the thus prepared mixed pellet to vapor deposition according to the vacuum heating vapor deposition, electron beam vapor deposition or sputtering.

Among these systems, the vacuum vapor deposition is one of the preferable systems for good reproducibility with simple operation and it is desirable to perform vacuum vapor deposition under a degree of vacuum of $5 \times 10^{-5}$ Torr or lower. The rate of vapor deposition is 0.1 to 50 Å/sec., preferably 1 to 40 Å/sec.

The film sensitive to electromagnetic radiation of the present invention may contain the above-mentioned substance which undergoes optical changes through absorption of electromagnetic radiation in an amount preferably within the range from 20 to 70 mole %, and its film thickness may suitably be between 300 Å to 5000 Å.

Figure 1:
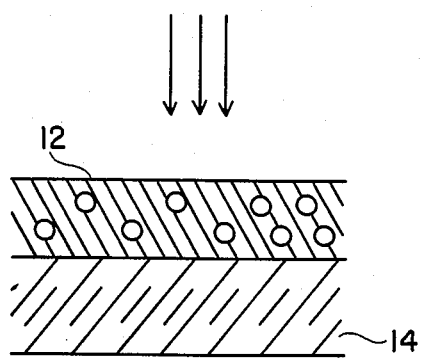
FIGS. 1-4 are cross-sectional views of several preferred embodiments of an optical recording medium according to the invention.
Figure 2:
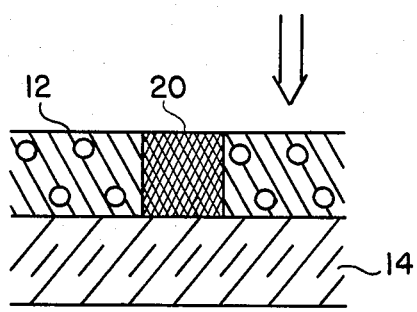
Figure 3:
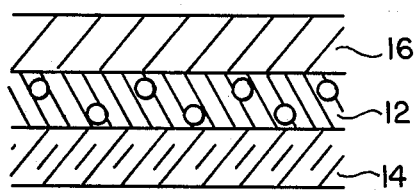
Figure 4:
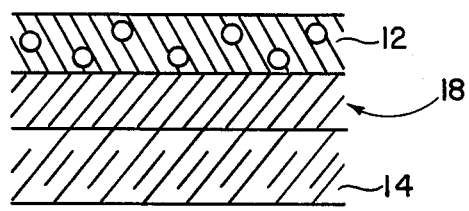

The optical recording medium of the present invention, which can be obtained by forming the layer 12 (see FIGS. 1a and 2) sensitive to electromagnetic radiation as mentioned above on a substrate 14 to be used as the support, can also have various auxiliary layers provided thereon. For example, for the purpose of controlling the thermal constant of the surface of the substrate, it is possible to use a substrate having a surface coating film comprising an inorganic or organic material. Also, there can be provided a protective layer 16 (see FIG. 3) comprising a transparent material on the film 27 sensitive to electromagnetic radiation, and such a protective layer is effective for prevention of mechanical damage, and also effective for improvement of sensitivity, since it can be made to have an appropriate thickness so as to function as a film for prevention of reflection. It is also possible to provide a reflection layer 18 (see FIG. 4) between the layer sensitive 12 to electromagnetic radiation and the substrate 14. The reflection layer may be made of a vapor deposited layer or a laminated layer of a reflective metal such as aluminum, silver or chromium.

In the optical recording medium of the present invention, there can also be formed what may be styled pregrooves, having the function of track guiding groove or address designating groove.

According to preferred embodiments of the invention, a coating film 12 containing at least one metal selected from the group of metals consisting of Te (tellurium), Pb (lead), Au (gold), Sn (tin) and As (arsenic) in a matrix comprising a lead iodide $PbIx_1$ ($0 < x_1 \leq 2$) or a thallium iodide $TlIx_2$ ($0 < \times x_2 \leq 3$) may be used as the film sensitive to electromagnetic radiation. The metals may be contained in the thin film consisting of lead iodide or thallium iodide preferably in an amount of 20 to 70 mole %, and pits 20 (see FIG. 2) can be formed on the coated film by irradiation from a short pulse light source, for example, gallium-arsenic-aluminum semiconductor laser (oscillated wavelength: 820 nm), argon gas laser (oscillated wavelengths: 488 nm, 515 nm), helium-neon gas laser (oscillated wavelength: 632.8 nm) or otherwise lasers having oscillated wavelengths from the visible region to the infrared region, various emission lamps like a xenon flash lamp, infrared lamp, or contact with a heater. (As used herein, a "pit" is an area whose surface optical properties have been changed to record information.) The pit-forming portions have a reflectance different from that of the non-pit-forming portions. Accordingly, for example, pits can be formed by scanning electromagnetic radiation along the track, and a low output laser can be scanned along said track having pit-forming portions and non-pit-forming portions to read the difference in reflectance therebetween by means of a photodetector.

For constitution of the optical recording medium of the present invention, the substrate to be used as the support may preferably be transparent, when recording is effected by permitting the light for information recording (electromagnetic radiation) to enter from the substrate side. As the light source for recording information on the recording medium, there may be employed a short pulse light source such as a semiconductor laser, argon gas laser, helium-neon gas laser or otherwise lasers having oscillated wavelengths from visible region to infrared region, and also various emission lamps like xenon flash lamp, as described above. Therefore, as the transparent substrate, it is preferred for improvement of sensitivity to use a material having a transparency suitable for the optical wave characteristics of the desired light source. In this context, a transmission of about 90% or more of the incident light may be mentioned as a measure of transparency.

As the transparent substrate having sufficient transmittance relative to any of the light sources as mentioned above, there may be employed films or sheets comprising inorganic materials such as glass, polymers such as polyester, polypropylene, polycarbonate, polyvinyl chloride, polyamide, polystyrene, polymethyl methacrylate, modified polymers of these, copolymers, polymer blends and others. In the case when the surface smoothness of the substrate itself has a great influence on the S/N ratio of signals as in a video disc, it is preferable to use a substrate which is prepared by coating a separate substrate uniformly with the aforesaid polymers according to spinner coating, etc.

As the transparent substrate, which can particularly preferably be employed, a film or a sheet of polyester or polymethyl methacrylate may be included.

On the other hand, when recording is effected by permitting the information recording light from the side opposite to the substrate, besides the transparent substrates as mentioned above, it is also possible to use a film or a sheet having colorant, as the substrate, pigment or reinforcing agent added to inorganic material or polymer, or a metallic plate such as aluminum alloy.

The present invention has the following effects, as compared with a recording medium to be used in the system wherein holes are formed on the recording surface by irradiation of laser beam or a recording medium to be used in the system wherein pits changed in optical characteristics such as reflectance or transmittance are formed on the recording surface.

(1) It has high sensitivity, with the laser-sensitive thin film having great absorption efficiency relative to the recording laser beam, and recording can be effected by helium-neon gas laser beam or a semiconductor laser beam with an energy density of 50 mJ/cm² or less.

(2) It has high reproduction efficiency. In reproducing the information recorded by helium-neon gas laser beam or a semiconductor laser beam, the difference $\Delta T$ in transmittance between the initial unrecorded portions and the recorded portions can be made 25% or more, and the difference $\Delta R$ in reflection can be made 15% or more.

The present invention is illustrated in detail by referring to the following Examples, in which the "filling percentage" means the volume percentage of the metal added in the film sensitive to electromagnetic radiation.

EXAMPLE 1

A disc substrate of polymethyl methacrylate with a diameter of 30 cm having good surface smoothness prepared according to the casting method was set in a vacuum vapor deposition tank. The disc is mounted so as to be rotatable near the middle portion of the device. The device is equipped internally with three boats for heating vapor deposition and an electron beam vapor deposition device having five crucibles with the central axis for rotation as their centers. In two or the boats were placed PbI₂ (lead iodide) and Te (tellurium), respectively. After the tank was evacuated to $2 \times 10^{-5}$ Torr, the rotational speed of the substrate was made 50 rpm, followed by vapor deposition to form a coated film with a thickness of 1000 Å so that the filling percentages tellurium may become 50%. The rate of vacuum deposition during this operation was 1 Å/sec.

The recording medium thus prepared was mounted on a turntable and, while rotating the turntable at a rotational speed of 1000 rpm, recording was performed by scanning along a track a gallium-arsenic-aluminum semiconductor laser (oscillated wavelength: 820 nm) with a light source output of 15 mW focused to a spot size of 1.0 μ through an optical lens and modulated to a pulse width of 4 MHz on the lead iodide-tellurium layer.

When the surface of the recorded recording medium was observed by an optical microscope, the ellipsoid-shaped pit-forming portions with shorter diameter of about 1 μ could be judged to be brighter, namely higher in reflectance, as compared with the non-pit-forming portions.

Also, when the same recording medium as described above was heated under vacuum at a temperature of 200° C. for 20 minutes and the changes in transmittance were measured, it was found that the optical changes had occurred.

Further, for measurement of enduring stability with lapse of time, the above recorded recording medium was left to stand under accelerated testing conditions of a temperature of 35° C. and a relative humidity of 95% for 240 hours and the surface of the recorded recording medium was observed by an optical microscope similarly as described above As the result, pits having high reflectance similar to those as observed before enduring test were recognized. When a low output gallium-arsenic-aluminum semiconductor laser was permitted to enter the recording medium which had been recorded and subjected to the enduring test, and the reflected light was detected, there could be obtained a wave pattern having a sufficiently high S/N ratio.

EXAMPLE 2

An optical recording medium was prepared according to the procedure as in Example 1, except for using In (indium) in place of Te (tellurium) employed in preparation of the optical recording medium as described in Example 1.

The changes in transmittance of the recording medium thus prepared when heated under vacuum at 200° C. for 20 minutes were measured. As the result, it was found that optical changes had occurred.

When the laser was caused to scan over the recording medium prepared in this Example in the same manner as in Example 1 and its surface was observed by an optical microscope, pits having high reflectance were recognized. Further, enduring stability and S/N ratio were measured similarly as in Example 1, and satisfactory results were obtained with respect to both of enduring stability and S/N ratio.

EXAMPLE 3

An optical recording medium was prepared according to the procedure as in Example 1, except for using Sn (tin) in place of Te (tellurium) employed in preparation of the optical recording medium as described in Example 1.

The changes in transmittance of the recording medium thus prepared when heated under vacuum at 200° C. for 20 minutes were measured. As the result, it was found that optical changes had occurred.

When the laser was caused to scan over the recording medium prepared in this Example in the same manner as in Example 1 and its surface was observed by an optical microscope, pits having high reflectance were recognized. Further, enduring stability and S/N ratio were measured similarly as in Example 1, and satisfactory results were obtained with respect to both of enduring stability and S/N ratio.

EXAMPLE 4

An optical recording medium was prepared according to the procedure as in Example 1, except for using Au (gold) in place of Te (tellurium) employed in preparation of the optical recording medium as described in Example 1.

The changes in reflectance of the recording medium thus prepared when heated under vacuum at 300° C. for 15 minutes were measured. As the result, it was found that reflectance had changed after heating from that before heating.

When the laser was scanned over the recording medium prepared in this Example in the same manner as in Example 1 and its surface was observed by an optical microscope, pits having high reflectance were recognized. Further, enduring stability and S/N ratio were measured similarly as in Example 1 to obtain satisfactory results with respect to both of enduring stability and S/N ratio.

EXAMPLE 5

An optical recording medium was prepared according to the procedure as in Example 1, except for using $TlI_3$ (thallium iodide) in place of $PbI_2$ (lead iodide) employed in preparation of the optical recording medium as described in Example 1.

When the laser was caused to scan over the recording medium prepared in this Example in the same manner as in Example 1, pits having high reflectance were recognized by observation by means of an optical microscope. Further, enduring stability and S/N ratio was measured similarly as in Example 1, satisfactory results were obtained with respect to both of enduring stability and S/N ratio.

We claim:

1. An optical recording medium for recording information by the formation of pits having a higher reflectivity than the areas surrounding the pits, by irradiation of a laser beam comprising: a substrate and a thin film which comprises (a) a substance capable of undergoing an optical change to form pits in said film having a high reflectivity by absorbing electromagnetic radiation from a laser beam and (b) a matrix of an iodine compound, said substance being present in said thin film in a range of from about 20 to about 70 mole %, inclusive.

2. An optical recording medium according to claim 1, wherein said iodine compound is at least one compound selected from the group consisting of copper (I) iodide, cesium iodide, tin (II) iodide, antimony (III) iodide, zirconium (IV) iodide, silver iodide, lead iodide and thallium (III) iodide.

3. An optical recording medium according to claim 1, wherein said iodine compound is $PbI_{x_1}$ ($0 < x_1 \leq 2$).

4. An optical recording medium according to claim 1, wherein said iodine compound is $TlI_{x_2}$ ($0 < x_2 \leq 3$).

5. An optical recording medium according to claim 1, wherein the substance undergoing an optical change through absorption of electromagnetic radiation is a substance which undergoes an optical change by action of heat.

6. An optical recording medium according to claim 5, wherein the substance undergoing an optpical change through absorption of electromagnetic radiation is at least one substance selected from the group consisting of Te, Pb, Au, Sn, As, Bi, In and carbon.

7. An optical recording medium according to claim 6, wherein said electromagnetic radiation is a semiconductor laser, argon gas laser or helium-neon gas laser.

8. An optical recording medium according to claim 1, wherein a protective layer is provided on said thin film containing a substance which undergoes an optical change through absorption of electromagnetic radiation.

9. An optical recording medium according to claim 1, wherein a reflection preventing film is provided on said thin film containing a substance which undergoes an optical change through absorption of electromagnetic radiation.

10. An optical recording medium according to claim 1, wherein a reflection layer is provided between said substrate and said thin film containing a substance which undergoes an optical change through absorption of electromagnetic radiation.

11. An optical recording medium according to claim 1, wherein the substrate is polyester or polymethyl methacrylate.

* * * * *

UNITED STATES PATENT AND TRADEMARK OFFICE
CERTIFICATE OF CORRECTION

PATENT NO. : 4,614,951          Page 1 of 2

DATED     : September 30, 1986

INVENTOR(S) : YOICHI OSATO, ET AL.

It is certified that error appears in the above-identified patent and that said Letters Patent is hereby corrected as shown below:

COLUMN 1

Line 22,  "1 3/4" should read --1µ--.

COLUMN 2

Line 40,  "]antimony" should read --[antimony--.
    Line 41,  "AgI[" should read --AgI [--.
    Line 42,  " iodede ]" should read --iodide]--.

COLUMN 3

Line 13,  "27" should read --12--.

COLUMN 4

Line 20,  "particularly" should read --most--.
    Line 33,  "of" should read --of a--.

UNITED STATES PATENT AND TRADEMARK OFFICE
CERTIFICATE OF CORRECTION

PATENT NO. : 4,614,951

DATED : September 30, 1986

INVENTOR(S) : YOICHI OSATO, ET AL.

It is certified that error appears in the above-identified patent and that said Letters Patent is hereby corrected as shown below:

COLUMN 5

Line 30, "before" should read --before the--.

COLUMN 6

Line 24-25, "to obtain satisfactory results" should read --, and satisfactory results were obtained--.
    Line 39, "was" should read --were--.
    Line 40, "Example 1" should read --Example 1 and--.

Signed and Sealed this

Thirty-first Day of March, 1987

Attest:

DONALD J. QUIGG

Attesting Officer    Commissioner of Patents and Trademarks